Figure 1:
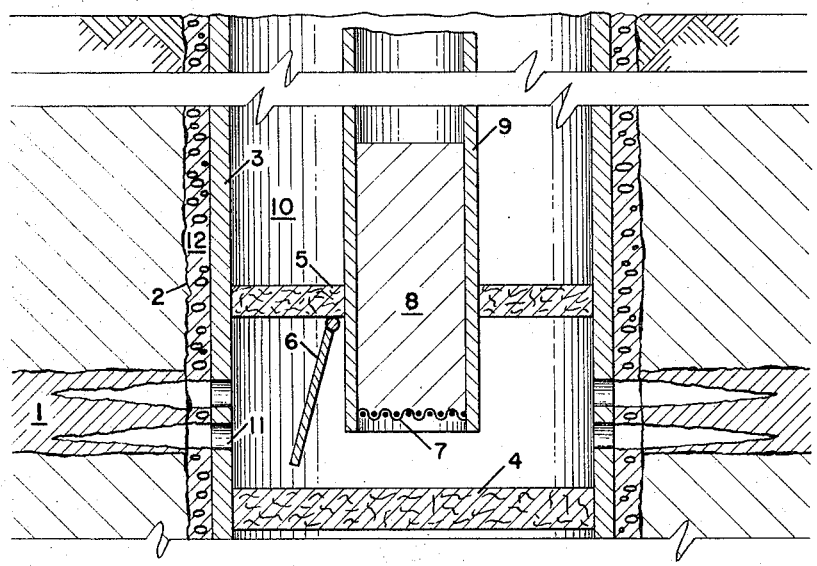

INVENTOR.
DERRY D. SPARLIN
BY
ATTORNEY

United States Patent Office 3,306,356
Patented Feb. 28, 1967

3,306,356
CATALYTIC POLYMERIZATION METHOD
Derry D. Sparlin, Ponca City, Okla., assignor to Continental Oil Company, Ponca City, Okla., a corporation of Delaware
Filed Mar. 23, 1964, Ser. No. 353,940
13 Claims. (Cl. 166—33)

This invention relates to a process for providing a polymer-catalyst mixture at a remote location. In one aspect, it relates to a process for applying a cementing agent to a formation. In another aspect, it relates to a process for consolidating or sealing incompetent sand formations utilizing a resin as the consolidating or sealing agent.

Frequently, it is desirable to provide a polymerizable material containing a catalyst at a remote location under conditions such that time and extent of polymerization can be controlled. For example, in the production of subterranean fluids, such as oil, gas, water, etc., a number of difficulties are encountered when the well by which the fluids are produced penetrates a loose or unconsolidated subterranean formation. Such formations frequently are composed of loose water or oil sands, and the grains of the sand become entrained in the fluid being produced to be carried into the well bore. The result of such entrainment, among other things, is the abrasion of the pumping equipment in the well bore, the clogging of strainers, and the sanding in of the cavity immediately adjacent the strainer. These results in turn ultimately cause a sharp decrease in the rate of production and high maintenance costs.

In an effort to reduce the deleterious results generally associated with producing fluids from an unconsolidated formation, it has heretofore been proposed to inject an age-hardenable cementing agent into the producing formation adjacent the well bore in order to consolidate or make rigid the formation. The cementing agent directly contacts the loose grains or particles in the formation and, by bonding them to each other, reduces their mobility.

One of the cementing agents widely used in such previous processes, and also in the instant process, is a resin-forming composition containing formaldehyde, phenol and a suitable catalyst. In one consolidating method, this composition, in liquid form, is pumped down the well bore and into the formation where it sets up to a hardened state upon standing. A variety of means is employed for flushing the excess resin from the formation so that the permeability of the formation is retained.

One of the problems associated with consolidating formation with a cementing agent has been the difficulty of controlling the time of polymerization, that is, obtaining polymerization when the cementing agent is in the desired location and within a reasonable period of time. Because of this, it has been necessary to provide close control over the quantity and concentration of catalysts employed, concentration of the cementing agent in its solvent, with regard to the placement time and temperature to be encountered, and the waiting time after the cementing agent is in place.

It is an object of this invention to provide a polymer-catalyst mixture at a remote location.

It is another object of this invention to provide an improved process for applying a cementing agent to a formation.

Still another object of this invention is to provide an improved process for consolidating incompetent formations.

Yet another object of this invention is to provide a polymer-catalyst mixture which is catalyzed by an acidic or basic compound at a remote location, i.e., a location which is not accessible for placement of the polymer-catalyst mixture by hand, whereby said mixture can be applied to a formation to consolidate or seal the formation.

Another object of this invention is to provide an improved process for controlling the time and location of polymerization when utilizing a polymerizable cementing agent which is catalyzed by an acidic or basic catalyst at a remote location.

The foregoing objects are realized broadly by a process which comprises passing a mixture of a polymerizable material and a salt solution through an ion exchange resin which is positioned in the proximity of a predetermined remote location, whereby said salt is converted by passage through said resin to a catalyst for the polymerizable material thereby providing a mixture of polymerizable material and catalyst.

In one aspect of the invention, the ion exchange resin is positioned in the lower portion of a well bore and a mixture of polymerizable material and catalyst passing therethrough is utilized as a cementing agent in the formation traversed by the well bore. The cementing agent can be applied to seal the formation or in the case of an incompetent formation, can be applied to consolidate the formation while substantially retaining the permeability thereof.

Either anionic or cationic exchange resins can be employed in carrying out the processes of this invention.

These resins react with the salt to provide the acid or base according to the following reactions:

| Ion Exchange Resin | Salt | Ion Exchange Resin | Acid or Base |
|---|---|---|---|
| ROH (anionic) + | NaCl → | RCl + | NaOH |
| RH (cationic) + | NaCl → | RNa + | HCl |

A typical anionic exchange resin is a polymer of styrene and divinyl benzene containing quaternary ammonium groups, having the following properties:

Density (chloride form), lb./cu. ft. _____ 38–40
Specific gravity (true density) _____ 1.07
Moisture content, percent _____ 55–58
Void volume (approx.), gal./cu. ft. _____ 3
Mesh size, (U.S. Standard) _____ 14–30

A typical cationic exchange resin is a sulfonated copolymer of styrene and divinyl benzene having the following properties:

Density (Na form), lb./cu. ft. _____ 52
Specific gravity (true density) _____ 1.31
Moisture content, percent _____ About 40
Void volume (approx.), gal./cu. ft. _____ 3.0
Wet mesh size _____ 16–40

It is within the scope of the invention to employ these and any of the other conventional anionic or cationic exchange resins. Many different types of these materials are available which are exemplified in issued patents, for example, in U.S. 3,100,751, 3,085,072, 3,044,969, 3,030,-318, and in other patents which are classified in Class 260, Subclass 2.2, of the United States Patent Office.

The amount of resin employed is that which is required to convert the salt to the acid or base, and can vary from about 0.025 to about 1.0 pound per gallon of cementing agent, and preferably from about 0.1 to about 0.25 lb./gal.

The cementing agents which are employed are those which are catalyzed by either an acidic or a base catalyst, suitable examples of which include the phenol aldehyde resins, such as phenol formaldehyde resin, alkyd resins, acrylic acid resins, epoxy resins, melamine resins, urea formaldehyde resins, polystyrene, polyisobutylene, polymethylstyrene and the like. Examples of these resins and methods of introducing them to formations are provided in U.S. Patents Nos. 2,378,817, 2,604,172, 2,823,-753, 2,981,334 and 2,476,015. These cementing agents can be employed in either the unpolymerized or partially polymerized state and with or without the presence of a diluent. The term "polymerization" as used herein is intended to include condensation reactions as well as the more narrowly defined polymerization processes. The particular cementing agent employed and the condition of the cementing agent will depend on the particular function which the cementing agent is to perform. For example, in a consolidating operation, the cementing agent is ordinarily diluted with a diluent to provide greater penetration of the formation and to assure maximum permeability. On the other hand, when it is desired to seal a formation, the cementing agent ordinarily is preferably concentrated and is selected to give maximum sealing effect.

The amount of cementing agent employed will depend on a number of parameters, including well geometry, formation characteristics, etc. For example, when utilizing phenol and formaldehyde to consolidate an incompetent formation, generally about 0.5 to about 15 barrels of cementing agent is employed per vertical foot of perforated interval with the preferred range being from about 0.5 to about 5 barrels.

The preferred catalysts which are used in carrying out the invention are derived from the inorganic alkali-metal salts, for example, sodium chloride, potassium chloride, sodium nitrate, potassium cyanide, sodium phosphate and the like. In addition, this invention contemplates as catalysts the acidic or basic compounds derived from inorganic and organic metal salts in general which are water soluble and readily ionized in water. Examples of organic salts include such compounds as sodium acetate, tetramethylammonium chloride, anilinium chloride and sodium benzene sulfonate. Other materials falling within this category need not be listed since they are, of course, well known to those skilled in the art.

Since the salts must be ionized to effect their conversion by contact with the ionic exchange resin to the acidic or basic catalyst, they are employed as solutions in water (preferably) or in another suitable solvent. These solvents are characterized by having high polarity, high dielectric constant, and good hydrogen bonding; and include such materials as the lower alcohols, for example, methanol, ethanol, propanol, and isopropanol; the amides such as acetamide and formamide; and other solvents such as methylamine and acetone.

The amount of salt employed in carrying out the invention will vary widely depending on the temperature in the formation and the type and concentration of the cementing agent. Usually the salt will vary from about 0.0005 lb. to about 0.3 lb. per lb. of the cementing agent, and preferably from about 0.002 to about 0.1 lb. per lb.

As stated previously, the above salts are converted to either an acidic or basic catalyst depending on the type of ion exchange resin which is employed in the process. Thus, with an anionic exchange resin the salt is converted by reaction with the ion exchange resin to a base. The same salt upon passage through a cationic exchange resin would, of course, be converted to an acid.

Polymerization of the cementing agent commences after the salt is converted to the catalyst by passage through the ion exchange resin. After a sufficient period of time has elapsed, the cementing agent will set up to a hardened state. This time interval can vary widely depending on the particular cementing agent employed, the amount of catalyst used, the degree of dilution of the cementing agent, the temperature of the formation and other factors. Ordinarily, the setting time will range from about 12 to about 48 hours, however, substantially lower or greater time periods can be utilized if desired.

Once employed for the purpose of the invention, the spent ion exchange resin can be removed and if desired washed and regenerated by conventional methods. Removal of the ion exchange resin can be effected after the cementing agent has hardened, however, since residual quantities of cementing agent and catalysts will remain in the resin, it is preferable to effect its removal before a substantial amount of polymerization occurs.

Under some circumstances, for instance when relatively low permeability formations are involved, formation plugging may become a problem. It is within the scope of the invention to employ any of the conventional plugging retardants, which are usually introduced in the preflushing liquid. Examples of suitable plugging retardants are: alcohols, such as, butanol, hexanol and isopropanol; ketones, such as, acetone and methylethyl ketone; and esters, such as, beta ethoxy ethyl acetate and beta methoxy ethyl acetate.

It is also within the scope of the invention to employ coupling agents to aid in consolidation. Such coupling agents comprise molecules having a group or atom capable of reacting with, or being held by, the formation sands and a reactive organic group which is capable of combining with the cementing agent. The coupling agents which are employed are those which are nonionic in nature and include, for example, the vinyl trichlorosilanes and aminoalkylethoxysilanes. The preferred compounds are those in which at least one of the alkyl substituents of the silicon atom is at least 3 carbon atoms in chain length so that the amino group which is attached to the terminal carbon atom of such alkyl group is located no closer to the silicon atom than the gamma position. $\gamma$-, $\delta$-, and $\epsilon$-aminoalkylethoxysilanes are also satisfactory as are higher homologues of these materials having extended alkyl chains attached to the silicon atoms, with the amino group bound to the terminal carbon atom of such extended alkyl chains.

One preferred embodiment of carrying out the invention involves consolidation of an incompetent formation. In this embodiment, the formation to be consolidated is first isolated by means well known in the art, such as, by packers. A quantity of diesel oil or crude oil is then injected into the formation to flush out the formation and cleanse the formation particles. Next, the ion exchange resin is positioned in the lower portion of the well casing. Following this, the cementing agent admixed with aqueous inorganic salt solution is introduced through the casing and ion exchange resin into the formation. Any excess of cementing agent is then removed from the interstices between the formation particles by flushing with an inert flushing material, following which the ion exchange resin is removed from the well case and the well is shut in for a period of time sufficient to permit the cementing agent to set up to a hardened state.

The use of a flushing agent prior to introduction of the cementing agent to the formation enhances the ability of the cementing agent to bond to the sand since this material functions to clean the surfaces of the sand particles and pore spaces between the sand particles. Although diesel fuel or crude oil are preferred as flushing liquids, other inert neutral materials which are compatible with the formation fluids, such as, hydrocarbon distillates, alcohols, etc., can be similarly employed. The exact volume of the flushing liquid which is injected will depend, among other things, on the thickness and porosity of the formation being treated and will usually vary from about 0.5 to 20 barrels per vertical foot of perforated interval to be treated.

The flushing material which is employed in removing excess of cementing agent from the formation is usually the same as that used in preflushing the formation. Again, in this service, any neutral inert compatible liquid can be employed. This step of the process, which is generally called over-flushing, may be as critical as the preflushing step since it involves removal of excess cementing agent from the formation. If too much flushing material is employed, insufficient cementing agent may remain in the formation; on the other hand, with too little flushing agent, the permeability of the treated formation may be unduly reduced. It has been found that the degree of criticality of the quantity of over-flushing can be substantially reduced by employing a partially polymerized cementing agent. Generally, for an unpolymerized cementing agent, less than 1 barrel per foot of perforated interval is used, while in the case of a partially polymerized cementing agent mixture, the over-flush varies from 0 to about 10 barrels per perforated foot.

This embodiment of the invention will be discussed in conjunction with the drawings, FIGURES 1 and 2, which generally depict a cross section of a well bore disposed in a producing formation.

Referring to FIGURE 1: reference numeral 1 represents the producing formation; 2 represents a hole drilled through the formation; 3 represents a casing pipe; 4 and 5 represent packers provided to isolate the producing formation; 6 represents a check valve open to downward force; 7 represents a mesh or grid to support ion exchange resin 8; 9 represents a tubing disposed within the casing and terminating below grid 7; 10 represents the annulus space between tubing and casing; 11 represents perforations made through the casing and cement into the formation; and 12 represents cement binding the casing to the walls of the well and aiding in isolating the zone to be treated.

In carrying out the preferred embodiment of the invention, the formation 1 is initially prepared for injection of the cementing agent by injecting 5 barrels of diesel fuel flushing agent into the formation at a rate of 0.5 barrel/minute to cleanse the surfaces of the sand particles.

Following this operation, 200 gallons partially polymerized phenol formaldehyde cementing agent admixed with an aqueous solution of 20.5 pounds sodium chloride is passed downwardly through tubing 9 and ion exchange resin 8 over a period of one hour, and into the formation. In its passage through the ion exchange resin, the sodium chloride reacts with the ion exchange resin and is converted to sodium hydroxide which acts as a catalyst for the phenol formaldehyde cementing agent. After the introduction of the cementing agent-inorganic salt solution has been completed, the formation is over-flushed with 5 barrels of diesel fuel at a rate of 0.1 barrel/minute to remove any excess phenol formaldehyde. Removal of the ion 6 exchange resin from tubing 9 is then effected by raising the tubing above check valve packer 5 and passing diesel fuel downwardly through annulus 10 and then upward through grid 7 at a rate of 1 barrel/minute until the ion exchange resin is washed from tubing 9 in an upwardly direction. Finally, the well is shut in for two hours to permit the phenol formaldehyde cementing agent in the formation to set up to a hardened state. After the cementing agent has hardened sufficiently, production of the well can then take place.

In addition to the method described in the discussion of FIGURE 1, alternate procedures can be employed for removing the ion exchange resin from the well. For example, the tubing containing the ion exchange resin can be pulled to the surface, emptied, and replaced in the formation after allowing sufficient time for curing of the cementing agent. Alternatively, after over-flushing with diesel fuel, the ion exchange bed can be neutralized by washing with a suitable acid or base, taking care not to allow the washing solution to enter the treated zone. The well can then be closed in until the cementing agent has hardened and the ion exchange resin then removed by various methods, such as, reverse circulation, without danger of damage to the treated zone.

Figure 2:
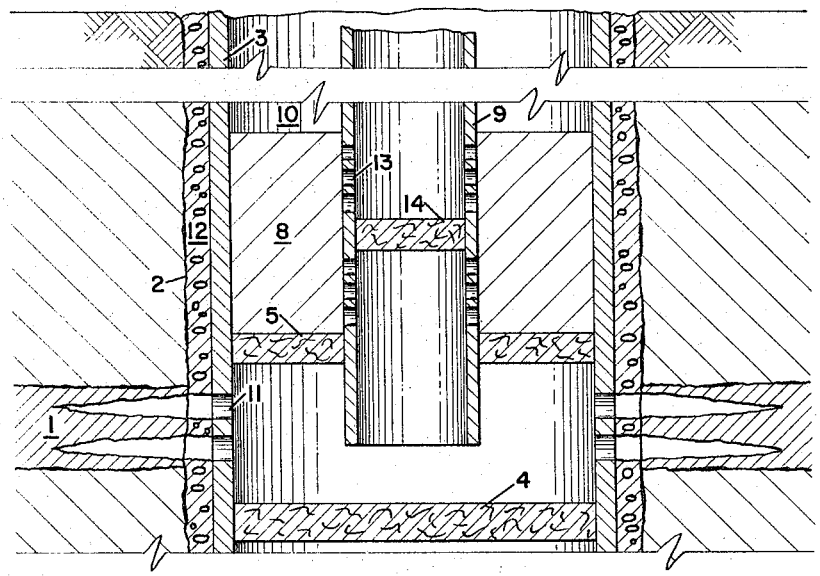

Another method for removing the ion exchange resin is illustrated in FIGURE 2. In this method, the tubing 9 is plugged at a point somewhat above the bottom section by the use of a suitable packer or plug 14. The tubing immediately above and below 14 is perforated with small holes 13 of a size to contain the ion exchange resin. The ion exchange resin 8 is placed in the annulus 10 adjacent the perforations 13, being supported in the annulus by packer 5. After treatment of the formation with the cementing agent, the tubing 9 is lowered to a point where the plug 14 is adjacent to packer 5. The ion exchange resin 8 is then removed by circulation downwardly through casing 9 and upwardly through annulus 10, without disturbing the treated zone.

The following examples are presented in illustration of the invention.

*Example 1*

Tests were conducted at three different concentrations of salt in a sand consolidating plastic. In each test, 1/10 pound of anion exchange resin [1] was flushed with a 4 percent NaOH deionized water solution. It was then rinsed with deionized water to a neutral pH. Diesel fuel was flushed through the resin bed until complete saturation was obtained. Next, a mixture of 50 ml. cementing agent A,[2] 50 ml. cementing agent B,[3] and varied amounts of a 25 percent solution of NaCl in deionized water was then put through. Samples of the effluent plastic were caught, and their reaction rates at 160° F. were determined.

| Ml. NaCl solution in plastic: | Minutes gelling [a] time |
|---|---|
| 1.5 | 125 |
| 3.0 | 59 |
| 6.0 | 35 |

[a] The gelling point of the polymer is reached when the polymer can no longer be poured from a container by turning it over. The gelling point is readily observed by this method due to an almost instant gellation after the energy activation has been supplied.

*Example 2*

Another test was conducted in a system submerged in a 160° F. water bath. A cylinder of clean sand (approximately 80–120 mesh) was attached to a 22-inch length of one-half inch copper tubing filled with 33 grams of anions exchange resin.[1] The resin in the tubing was then pretreated with a 4 percent NaOH solution followed by neutralization with deionized water and then a diesel fuel flush to interstitial water saturation.

After entering the 160° F. bath, the whole system was flushed with 160° F. diesel fuel. A mixture of 50 ml. cementing agent A,[2] 50 ml. cementing agent B,[3] and 3 ml. 25 percent solution NaCl in water was then flushed through followed by 150 ml. diesel fuel.

The permeability of the sand pack before treatment was 4.739 darcys. After the plastic treatment had cured 15 hours at 160° F., the sand pack had a permeability of 3.001 darcys.

The compressive strength of the sand after the plastic treatment had cured 16 hours at 160° F. was 65 p.s.i.

*Example 3*

A 50 ml. burette containing 0.1 pound cation exchange

---

[1] A polymer of styrene and divinyl benzene containing quaternary ammonium groups, having the following properties:

| | |
|---|---|
| Density (chloride form), lb./cu. ft. | 38–40 |
| Specific gravity (true density) | 1.07 |
| Moisture content, percent | 55–58 |
| Void volume (approx.), gal./cu. ft. | 3 |
| Mesh size (U.S. Standard) | 14–30 |

Sold by Nalco Chemical Company under trade name Nalcite SBR–M.

[2] Phenol-formaldehyde resin prepared in accordance with Example 2 of U.S. Patent No. 2,823,753.

[3] Resin of cresylic acid, formaldehyde and paraformaldehyde prepared in accordance with column 3, line 65 to column 4, line 9, of U.S. Patent No. 2,823,753.

resin [4] was charged with dilute HCl. It was then flushed with water until the effluent was of neutral pH. No. 1 diesel fuel was then flushed through until no water was found in the effluent. At this time, 25 ml. A, cementing agent,[2] 25 ml. B cementing agent [3] containing 2.5 ml. 11 percent aqueous NaCl was flushed through the ion exchange resin.

Samples of the effluent resin were caught periodically and their curing rates were evaluated at 160° F. All samples were set within 16 minutes with a composite sample setting in 14 minutes.

Samples of cementing agent A and cementing agent B with equivalent concentrations of HCl for catalyst were tested and yielded a 12-minute curing time at 160° F.

A sample of A and B cementing agent containing 5 percent by volume of an 11 percent aqueous solution of NaCl was cured at 160° F. It had not set after 3½ hours.

*Example 4*

One-half pound of anion exchange resin [1] was saturated with deionized water and flushed with a solution of 22.7 grams of sodium hydroxide in 568 cc. of deionized water. This served to activate the resin. The resin was then rinsed with deionized water until the effluent water was of neutral pH and was then saturated completely with diesel fuel.

Next a mixture of 25 cc. of cementing agent C,[5] 25 cc. of cementing agent D,[6] and 1.5 cc. of a 25 percent solution of NaCl in deionized $H_2O$ was passed through the resin. The resin was then flushed with 1000 cc. of diesel fuel.

Three samples of the effluent cementing agent mixture were placed in a 160° F. bath where they cured in 40 minutes.

A sample of the cementing agent mixture C and D above, mixed with NaCl solution that had not been passed through the resin pack was also placed in the 160° F. bath. After three days it had not set. This example shows that ions will exchange in a diesel fuel environment and that a sand consolidation cementing agent can be catalytically polymerized by passing it and a suitable aqueous salt solution through a bed of ion exchange resin. Also that the salt alone will not set the cementing agent.

Although this invention has been described with respect to particular embodiments thereof, it is not to be so limited, as changes and modifications may be made therein which are within the spirit and scope of the invention as defined by the appended claims.

I claim:

1. A process for providing a polymer-catalyst mixture at a remote location utilizing a polymerizable material selected from the group consisting of phenol aldehyde resins, alkyd resins, acrylic acid resins, epoxy resins, melamine resins, urea formaldehyde resins, polystyrene, polyisobutylene, and polymethylstyrene which is catalyzed by a catalyst selected from acidic and basic compounds which comprises passing a mixture of said polymerizable material in a liquid state and salt solution through a permeable mass of an ion exchange resin positioned in the proximity of said remote location, wherein said salt is converted to a catalyst for said polymerizable material.

2. The process of claim 1 in which the ion exchange resin is positioned in the lower portion of a well bore.

3. A process for applying a cementing agent selected from the group consisting of phenol aldehyde resins, alkyd resins, acrylic acid resins, epoxy resins, melamine resins, urea formaldehyde resins, polystyrene, polyisobutylene, and polymethylstyrene to a formation which comprises:
   (a) positioning a permeable mass of ion exchange resin in the proximity of said formation;
   (b) passing a mixture of polymerizable cementing agent and salt solution through said ion exchange resin wherein said salt is converted to a catalyst for polymerizing said cementing agent;
   (c) passing said cementing agent and catalyst in contact with said formation; and
   (d) retaining said cementing agent and catalyst in contact with said formation for sufficient time to allow the cementing agent to set up to a hardened state.

4. The process of claim 3 in which the amount of salt varies from between about 0.0005 pound and about 0.3 pound per pound of cementing agent.

5. A process for consolidating incompetent formations which comprises:
   (a) positioning a permeable mass of ion exchange resin in the proximity of said formation;
   (b) passing a mixture of polymerizable cementing agent selected from the group consisting of phenol aldehyde resins, alkyd resins, acrylic acid resins, epoxy resins, melamine resins, urea formaldehyde resins, polystyrene, polyisobutylene, and polymethylstyrene and salt solution through said ion exchange resin wherein said salt is converted to a catalyst for polymerizing said cementing agent;
   (c) passing said cementing agent and catalyst into said formation; and
   (d) retaining said cementing agent and catalyst in said formation for a sufficient period of time to allow the cementing agent to set up to a hardened state.

6. The process of claim 5 in which the spent ion exchange resin is removed after the mixture of polymerizable cementing agent and salt solution have been passed therethrough.

7. The process of claim 5 in which the amount of salt varies from between about 0.0005 pound and about 0.3 pound per pound of cementing agent.

8. The process of claim 7 in which the cementing agent is introduced into the ion exchange resin in solution.

9. A process for consolidating an incompetent formation traversed by a well bore which comprises:
   (a) isolating the formation;
   (b) supporting a permeable mass of ion exchange resin in the well bore in the proximity of the isolated formation;
   (c) flushing liquid into the formation to cleanse the formation particles;
   (d) passing a mixture of polymerizable cementing agent selected from the group consisting of phenol aldehyde resins, alkyd resins, acrylic acid resins, epoxy resins, melamine resins, urea formaldehyde resins, polystyrene, polyisobutylene, and polymethylstyrene and aqueous inorganic salt solution through said ion exchange resin wherein said salt is converted to a catalyst for polymerizing said cement agent;

---

[1] A polymer of styrene and divinyl benzene containing quaternary ammonium groups, having the following properties:

| | |
|---|---|
| Density (chloride form), lb./cu. ft. | 38–40 |
| Specific gravity (true density) | 1.07 |
| Moisture content, percent | 55–58 |
| Void volume (approx.), gal./cu. ft. | 3 |
| Mesh size (U.S. Standard) | 14–30 |

Sold by Nalco Chemical Company under trade name Nalcite SBR–M.

[2] Phenol-formaldehyde resin prepared in accordance with Example 2 of U.S. Patent No. 2,823,753.

[3] Resin of cresylic acid, formaldehyde and paraformaldehyde prepared in accordance with column 3, line 65 to column 4, line 9, of U.S. Patent No. 2,823,753.

[4] Transparent water white polymer of styrene and divinyl benzene containing sulfonic acid groups sold by Nalco Chemical Compay under trade name Nalcite HCR–W and having the following properties:

| | |
|---|---|
| Density (Na form) | 50 lb./cu. ft. (approx.). |
| Specific gravity (true density) | 1.280. |
| Moisture content (Na form) | 45% (approx.). |
| Void volume (approx.) | 3.0 gal./cu. ft. |
| Wet mesh size | Principally 16–40 mesh. |

[5] 50 percent solution of phenol-formaldehyde resin in ethanol sold by Dowell Division of Dow Chemical Company under the trade name K70.

[6] Resin similar to K70. Sold also by Dowell Division of Dow Chemical Company under the trade name K71.

(e) passing said cementing agent and catalyst into said formation;
(f) flushing the formation with liquid to remove excess cementing agent; and
(g) retaining said cementing agent and catalyst in said formation for a sufficient period of time to allow the cementing agent to set up to a hardened state.

10. The process of claim 9 in which the spent ion exchange resin is removed after the mixture of polymerizable cementing agent and aqueous inorganic salt solution have been passed therethrough.

11. The process of claim 10 in which the cementing agent is a phenol-formaldehyde resin.

12. The process for sealing a formation traversed by a well bore which comprises:
(a) isolating the formation;
(b) supporting a permeable mass of ion exchange resin in the well bore in the proximity of said formation;
(c) passing a mixture of polymerizable cementing agent selected from the group consisting of phenol aldehyde resins, alkyd resins, acrylic acid resins, epoxy resins, melamine resins, urea formaldehyde resins, polystyrene, polyisobutylene, and polymethylstyrene and aqueous inorganic salt solution through said ion exchange resin wherein said salt is converted to a catalyst for polymerizing said cementing agent;
(d) passing said cementing agent and catalyst in contact with said formation; and
(e) retaining said cementing agent and catalyst in contact with said formation for a sufficient period of time to allow the cementing agent to set up to a hardened state.

13. The process of claim 12 in which the spent ion exchange resin is removed after the mixture of polymerizable cementing agent and aqueous inorganic salt solution have been passed therethrough.

References Cited by the Examiner

UNITED STATES PATENTS

| | | | |
|---|---|---|---|
| 3,176,767 | 4/1965 | Brandt et al. | 166—33 |
| 3,221,814 | 12/1965 | Hower | 166—33 |

OTHER REFERENCES

Roberts et al.: Basic Principles of Organic Chemistry, W. A. Benjamin, Inc., 1965, pp. 1115, 1116, QD 251 R 58 C5.

CHARLES E. O'CONNELL, *Primary Examiner.*

JACOB L. NACKENOFF, *Examiner.*

S. J. NOVOSAD, *Assistant Examiner.*